United States Patent
Connell

(10) Patent No.: US 6,461,399 B1
(45) Date of Patent: Oct. 8, 2002

(54) ORGANIC MATERIAL BASED UNIPRILL FERTILIZER

(76) Inventor: Larry V. Connell, 309 N. 84th Ave., Yakima, WA (US) 98908

(*) Notice: Subject to any disclaimer, the term of this patent is extended or adjusted under 35 U.S.C. 154(b) by 0 days.

(21) Appl. No.: 09/458,799

(22) Filed: Dec. 10, 1999

(51) Int. Cl.$^7$ ................................................ C05F 11/08
(52) U.S. Cl. ..................... 71/11; 71/61; 71/63; 71/64.03
(58) Field of Search ................................ 71/11, 61, 63, 71/64.03

(56) References Cited

U.S. PATENT DOCUMENTS

| | | | |
|---|---|---|---|
| 4,306,978 A | 12/1981 | Wurtz | 210/750 |
| 4,743,287 A | 5/1988 | Robinson | 71/12 |
| 4,872,998 A | 10/1989 | Dausman et al. | 210/710 |
| 4,902,431 A | 2/1990 | Nicholson et al. | 210/751 |
| 4,933,105 A | 6/1990 | Fong | 252/303 |
| 5,021,247 A * | 6/1991 | Moore | 426/69 |
| 5,346,527 A | 9/1994 | Rehbein et al. | 71/12 |
| 5,435,923 A * | 7/1995 | Girovich | 210/770 |
| 5,451,240 A * | 9/1995 | Trowbridge | 71/24 |
| 5,454,849 A | 10/1995 | Rehbein et al. | 71/12 |
| 5,466,273 A * | 11/1995 | Connell | 71/11 |
| 5,656,060 A | 8/1997 | Townley | 71/24 |
| 5,743,934 A * | 4/1998 | Wommack et al. | 71/28 |

OTHER PUBLICATIONS www.silverson.com "In–Line Mixers" web page (4 pages), Nov. 16, 1999.
www.rootblast.com "Elements Essential for Robust Plant Growth" web page (2 pages), Oct. 13, 1999.
www.feeco.com "Drum Granulators" web page (1 page), Nov. 17, 1999.
www.feeco.com "Rotary Dryers" web page (2 pages), Nov. 17, 1999.
www.feeco.com "Rotary Drums, Dryers, & Coolers" web page (2 pages), Nov. 17, 1999.
www.feeco.com "Agglomeration Systems" web page (1 page), Nov. 16, 1999.
www.feeco.com "Pin Agglomerators" web page (2 pages), Nov. 16, 1999.
www.feeco.com "Pin Mixers" web page (1 page), Nov. 16, 1999.
"Vincent Screw Press" Flyer, Vincent Corporation, Tampa, FL.
"Potash Mineral Commodity Summary" Jan. 1999, James P. Searls, U.S. Geological Survey.
"Winning the Organics Game—A Guide to Marketing Compost" EM Magazine, Aug. 1998, pp. 52–53.

* cited by examiner

Primary Examiner—Chhaya D. Sayala
(74) Attorney, Agent, or Firm—Stratton Ballew PLLC

(57) ABSTRACT

An organic-based uniprill fertilizer is provided. To produce the fertilizer, organic matter is sequentially pre-treated by first mixing it in a first grinder with a lime admixture, then adding a slurry of reagents and binders, followed by a mixture of acids. The acids can include sulfuric and phosphoric acids, in addition to nitric acid and various organic acids such as citric and fulvic acid, depending on the end requirements of the fertilizer product. Following the mixing of the pre-product with the mixture of acids and reagents, the resultant raw product is preferably processed through a second grinder. This grinding further dries, mixes and granulates the raw product. The particle size of the completed fertilizer is reduced into a flowable, user safe uniprill product that can be further ground to reduce its moisture. Further drying may be necessary for bag or bulk product, or it can be liquified by high speed blending or micro-fluidized for sprinkler or drip applications. The uniprill fertilizer comprises small, preferably microscopic particles that are homogenous in nature, in that any single particle is substantially identical in composition to all other particles of the fertilizer. Additionally, each uniprill particle contains substantially all sixteen nutriments and minerals required for the growth of healthy plants.

14 Claims, 3 Drawing Sheets

ORGANIC MATERIAL BASED UNIPRILL FERTILIZER

TECHNICAL FIELD

The invention relates generally to a method of treating and grinding raw organic matter, such as manures and straws, to create a complete and balanced plant food. More specifically, the invention relates to the sequential treatment of an organic material being prepared through a grinding process, by mixing it with a calcium source followed by a slurry of plant nutrients. This initial treatment is followed by granulation and the addition of supplemental nutrients to form a homogenous, "uniprill" fertilizer product.

BACKGROUND OF THE INVENTION

Nature has perfected the recycling of elements necessary for sustained plant growth. Sixteen elements are known to be essential for ideal genetic expression in plants, and for maximizing plant growth. These elements are generally considered to be:

| Carbon | Hydrogen | Oxygen | Nitrogen |
|--------|----------|--------|----------|
| Phosphorus | Potassium | Calcium | Magnesium |
| Sulfur | Boron | Chlorine | Copper |
| Iron | Manganese | Molybdenum | Zinc |

The earth is essentially a closed system in which these sixteen elements are recycled or moved from one location to another (for example, from the top soil to the ocean or atmosphere). In nature, we observe a precise method of recycling these critical elements, and it is necessary for man to work in harmony with this method. When we disrupt the natural cycle, we place our sources of food, fiber, and energy in jeopardy.

Humanity has in some ways short-circuited nature with large scale agriculture. Soil, which provides the nutrients required to grow the healthy crops on which we depend, is quickly depleted. In our attempt to industrialize and scale-up farming practices, we bypass nature and plant a rapid succession of nutrient sapping crops which cannot replenish the soil. To supplement or even supplant nature, farmers must turn to industry to provide fertilizers to keep the soil infused with the sixteen required nutrients and vital organic materials.

Organic materials are by-products of plants or animals, and are relied upon as excellent sources of fertilizer feedstock. Several U.S. patents relate to the production of fertilizers from such organic materials. U.S. Pat. No. 4,743,287 to Robinson teaches a method that claims to create "humic acid molecules." Humic acids are structurally complex organic acids that provide superior binding sites for ionic nutrients. These ionic nutrients are readily held in the soil by the humic acids, for exchange to and assimilation by plants, as needed. Robinson suggests that such humic acids, the "storage molecule of plant nutrients," can be formed within minutes using an acid and a base combined in rapid sequence in the presence of organic matter and soluble salt forms of fertilizer.

Page 4, line 20 of Robinson '287 describes a fertilizer product containing 52% humic acid, 8.32% nitrogen, 6.2% $P_2O_5$, and 1.09% $K_2O$, manufactured by his method. Robinson states this result was accomplished in a sealed, pressurized reactor, after mixing sulfuric acid and anhydrous ammonia into the reactor, in the presence of screened organic matter and soluble salts.

The inventor of the present invention has found that the quick manufacture of quality humic acid by the method disclosed by Robinson '287 is at best difficult to repeat. Additionally, pressurized reactor systems are costly and potentially dangerous. This is especially true when anhydrous ammonia is utilized. Anhydrous ammonia is a toxic material that requires special handling, closely followed safety procedures, and strict regulatory permits and oversight. A method for manufacturing a humic acid fertilizer is needed that does not require pressurized reactor vessels or anhydrous ammonia.

Accomplishments by the inventor of the present invention in the field of fertilizer production are disclosed in U.S. Pat. No. 5,446,273, which teaches the use of anhydrous ammonia in a minimum of 40% moisture environment. However, as discussed above, anhydrous ammonia poses problems in an industrial site. Anhydrous ammonia is difficult to control and efficiently meter, and is subject to stringent emission regulations. Safety considerations lead to a dramatic increase in expenses when anhydrous ammonia is utilized. A method for producing an organic material fertilizer is needed that does not require the use of anhydrous ammonia as a raw material.

SUMMARY OF INVENTION

The present invention provides an organic-based fertilizer. The fertilizer contains all the sixteen elements needed for optimum plant heath. The fertilizer of the present invention can be manufactured in a uniprill formulation. The uniprill formulation is defined as a finely granulated product, wherein each granule substantially contains the same ingredients, in the same proportions, as the product in bulk.

The process of the invention includes sequential pretreatment of organic matter by mixing and grinding it with a lime admixture, forming a pre-product. The lime admixture provides a source of calcium ions for the fertilizer. This pre-treatment is followed by adding a slurry of reagents and binders, followed by a mixture of acids, such as sulfuric and phosphoric. The mixture of acids can also include nitric acid or various organic acids such as citric and fulvic acid, depending on the end requirements of the fertilizer product.

The grinder action typically reduces the moisture content of the organic material by approximately 50%, by weight, each time it is passed through the grinder. This remaining moisture, in addition to the inherent moisture content of the dry additives, results in a raw product having a final moisture content of 10% to 15%, by weight. Further drying may be necessary for the uniprill product. The raw product can alternatively be liquified with a high speed blending or a micro-fluidizing process, for sprinkler or drip irrigation application.

Following the mixing of the pre-product with the mixture of acids and reagents, the resultant raw product, if dry and fine enough, is run through an agglomerator for uniprill formation, followed by a sizing operation through screens. In the event the admixture has moisture in excess of that required for agglomeration and/or the particle size needs further reduction, the product is preferably processed through a second grinder. This grinding further dries, mixes and granulates the raw product. The particle size of the finished fertilizer is reduced, resulting in a flowable and user safe uniprill product.

According to one aspect of the invention, the method of the present invention does not include a closed, pressurized reactor. Additionally, no anhydrous ammonia is utilized in the process. Additionally, no humic acid-type materials such as leonardite, humate or coal need to be added to the organic material in the initial mixture. No composting of the raw organic materials is required.

According to another aspect of the process of the present invention, the use of anhydrous ammonia is not employed in the process as a pH basic material, and instead a lime admixture is utilized with an organic material feedstock. The lime admixture and organic feedstock are combined with a micronized liquid slurry of reagents, and a combination of acids, which all takes place in a 20% to 35% moisture medium, by weight.

According to yet another aspect of the present invention, a fertilizer product with the required organic nutrients is provided by grinding, filtering, and micronizing. The micronizing of the fertilizer product has proven to be important. The maximizing of surface area per unit volume provides many features essential for a commercial product, including: greater disinfection control; an increased ability to dry and thoroughly mix the ingredients; and, an increased ability to use a variety of organic materials in one batch. The reaction of $NH_3$ and $H_2O$, performed in a reactor, is no longer necessary to form $(NH_3)OH$. This improvement requires much less water in the process and almost eliminates drying of the product.

Most conventional fertilizers are a coarse, solid phase mixture or conglomerate of component particles. These component particles in conventional fertilizers can include individual nitrate, sulfate and phosphate granule materials. The uniprill fertilizer of the present invention comprises small, preferably microscopic particles that are homogeneous in nature, in that any single particle is substantially identical in composition to all other particles of the fertilizer. Additionally, each uniprill particle contains substantially all sixteen nutrients and minerals required for the growth of healthy plants.

DETAILED DESCRIPTION OF SPECIFIC EMBODIMENTS

Figure 1:
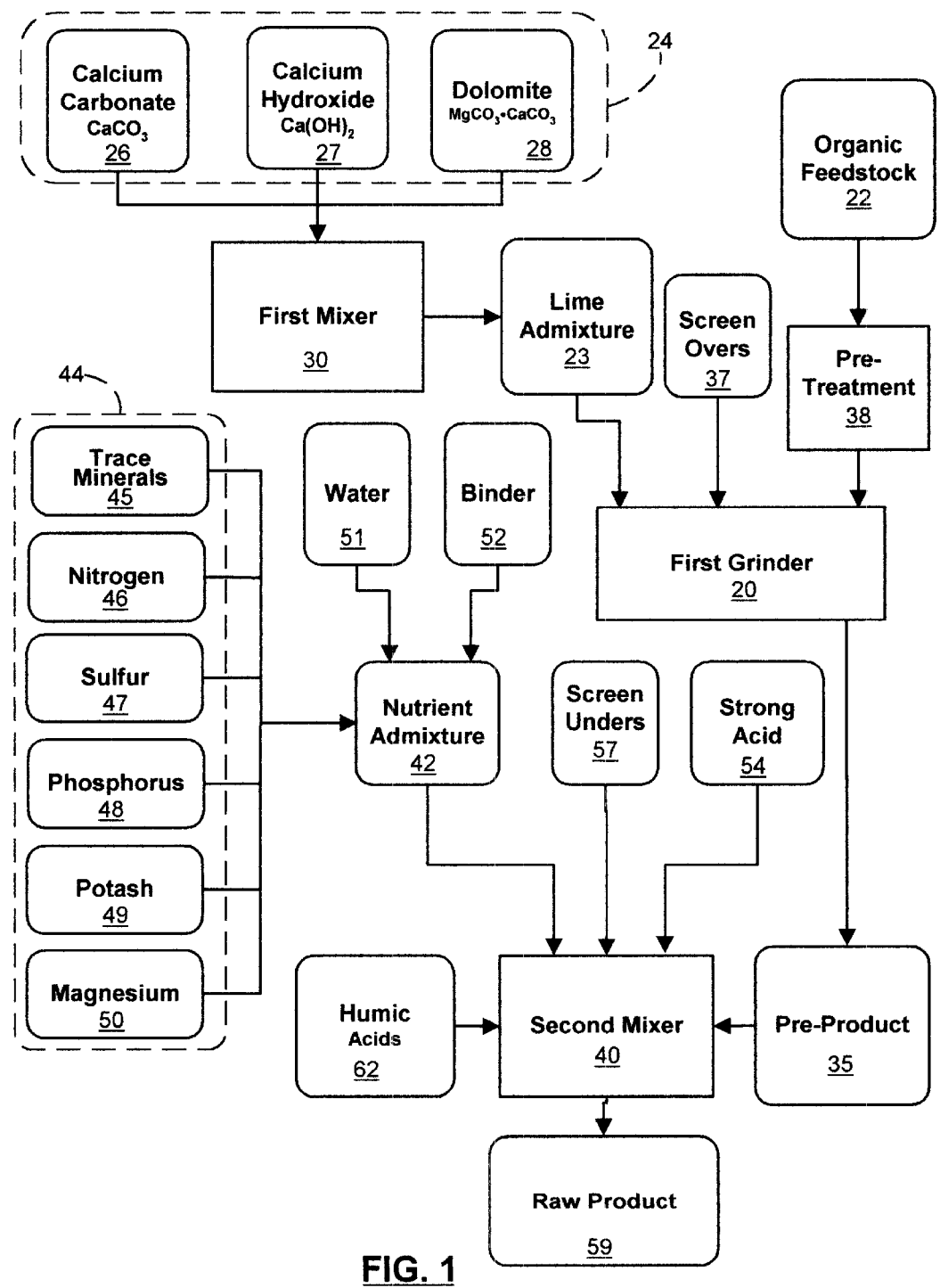
FIG. 1 is a block flow schematic diagram of a method for manufacturing an organic-based fertilizer, according to an embodiment of this invention.

The present invention includes a method for the production of a uniprill fertilizer. The term "uniprill" is used to describe the formulation of the preferred product of the present invention. The uniprill formulation is defined as a finely granulated product. Furthermore, each granule substantially contains the same ingredients, in the same proportions, as the product, when analyzed in bulk. By processing an organic material with a nutrient supplement after combining it with a lime admixture, the novel uniprill fertilizer is produced. As shown schematically in FIGS. 1 through 3, a uniprill product 10 for use as a fertilizer can be manufactured by treating and supplementing an organic feedstock 22 with a lime admixture 23, by a method that includes the following process steps:

A. Formation of Lime Admixture

The lime admixture 23 is an important and fundamental component of the uniprill product 10 of the present invention. The lime admixture is a specific blend of calcium salt materials 24. The calcium salt materials are preferably either carbonated or hydrated salts of calcium. Most preferably, calcium carbonate ($CaCO_3$) 26, calcium hydroxide ($Ca(OH)_2$) 27, or mineral dolomite ($MgCO_3 \cdot CaCO_3$) 28, are the calcium salt materials employed, either alone or in combination.

Calcium carbonate 26, or limestone, is a widely available material that is typically mined and converted into lime (CaO) in a furnace. Calcium hydroxide 27, or slaked lime, is a common byproduct of lime treated with water or used as a desiccant. Dolomite 28 is a common mineral that includes limestone and additionally magnesium carbonate. Magnesium is an important plant nutrient, and so dolomite is a preferred supplement to the lime admixture, especially when an analysis of soil or crop needs indicate that this supplement is required.

Based on price, availability and, importantly, the desired final composition of the uniprill product, the calcium salt materials 24 are blended in a first mixer 30 to form the first lime admixture 23. The first mixer is preferably an agglomerator. Agglomerators are generally defined as the upgrading of the size of fine particles. Most preferably the first mixer is a pin agglomerator, such as manufactured by FEECO, International of Green Bay Wis., U.S.A. The pin agglomerator includes a multiple of rotating pins that impact the materials of the lime admixture to begin a formation of small pellets, or uniprills.

The lime admixture 23 is preferably a solid phase mixture that can be stored in any appropriate location, such as bins, silos, trenches, or piles on a slab. However, the lime admixture should be protected from the weather, as rain will dissolve many of its constituents and wind can disperse it when the lime admixture is in the powdered form.

B. Pre-Grind and Initial Basification

Figure 2:
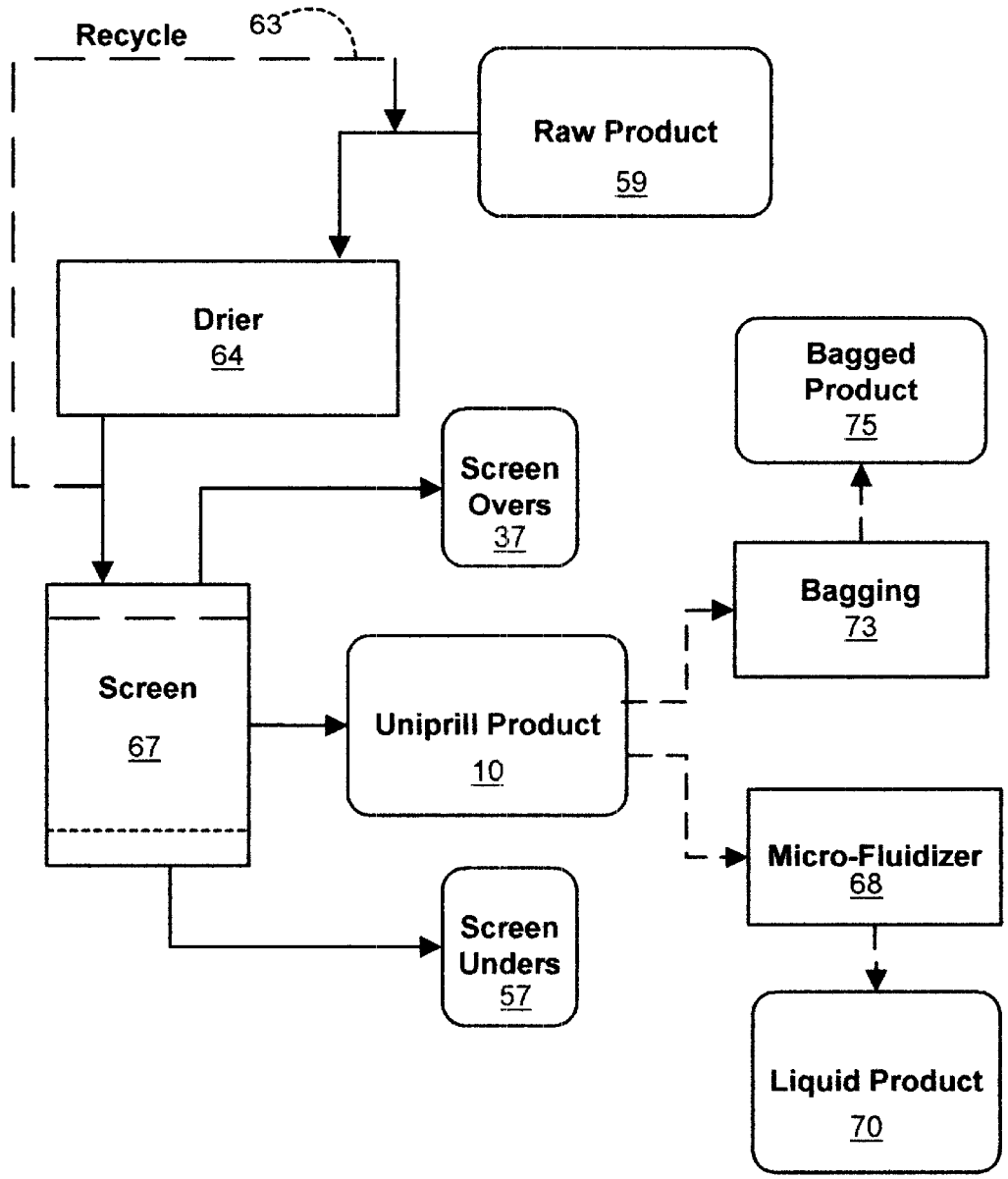
FIG. 2 is a block flow schematic diagram of a method for manufacturing an organic-based fertilizer, according to an embodiment of this invention.
Figure 3:
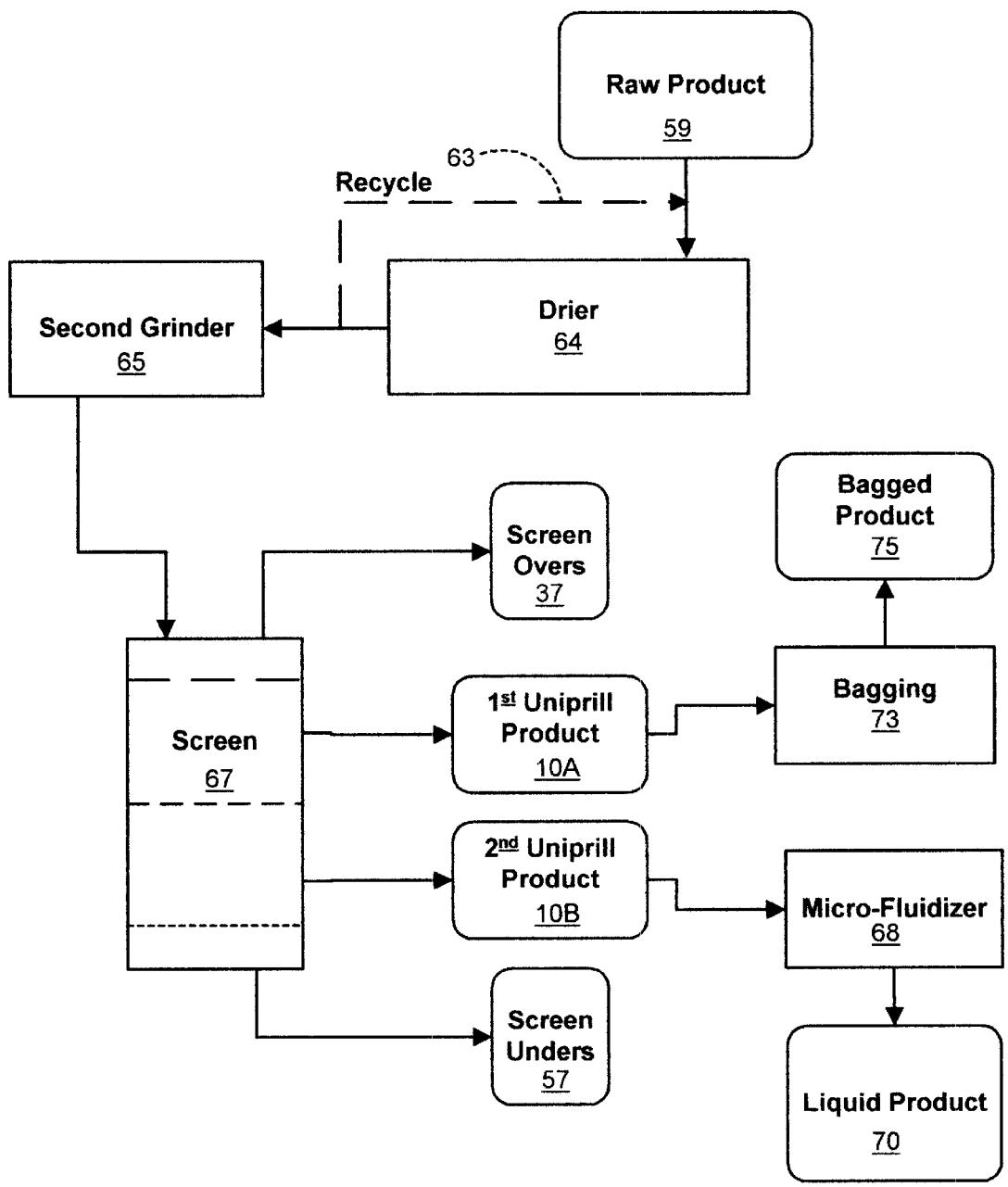
FIG. 3 is a block flow schematic diagram of a method for manufacturing an organic-based fertilizer, according to an embodiment of this invention.

The lime admixture 23 is combined with the organic feed stock 22 in a pre-grind processing step performed within a first grinder 20. The first grinder is preferably a vertical cyclone. Vertical cyclones are generally large grinding devices, especially suited to larger scale operations. Vertical cyclones have the unique ability to dry or drive off moisture as a material is ground, mixed and blended within. Most preferably, a "Mobile PowerMaster 250™" brand of vertical cyclone organic waste processor, as manufactured by American Resource Technologies of Sterling, Colo., U.S.A., is employed to grind and blend the lime admixture, together with the organic feedstock. The result of the first grinding is a basified organic feedstock, which forms a pre-product 35. The first grinder can also receive oversized product, designated in FIG. 1 as screen overs 37. The screen overs are generated in later process steps, which are shown in FIGS. 2 and 3.

The organic feedstock 22 is selected on the basis of its nutrient content, moisture level, cost and availability. The organic feedstock can include many materials that preferably include a substantial percentage of animal waste or manure materials. Organic materials well suited for the present invention can include chicken, cattle and hog manures, municipal sewage sludge, and animal processing wastes, such as blood meal. The organic feedstock, also preferably includes biomass materials. Farming waste, crop residues, agricultural debris and lawn clippings could all be utilized and, preferably mixed with the manure materials or sewage sludges. The relative ratio of each component is based upon the desired end product formulation, as prescribed for a specific soil and crop need for the fertilizer application. This assessment of soil deficiencies versus crop nutrient needs can be made by any person skilled in the art of making such analyses. Typically, these persons are specialists in horticultural science, and often associated with university agricultural extensions.

When liquid, waste water, or sludge materials are employed as organic feed stock 22, the liquid materials are preferably pre-treated to extract nutrients before introduction into the first grinder 20. A preferred pre-treatment 38 is "micro-filtering," which is a well known industrial process that removes larger nutrient particles from a liquid containing dissolved and suspended solids. As an alternative to micro-filtering, various other methods of separating organics from water are commercially available, such as mechanical presses, galvanic agglomeration, bubble filtering, and electro or chemical flocculation. Many of these known micro-filtering methods take advantage of the electrostatic affinities of the dissolved and suspended solid constituents of the liquid organic feedstock to separate the organic filtrate from the liquid solute. Alternatively, electrochemical destabilization can be employed to promote dewatering. This technique drives off water from solid materials by chemically reducing the water absorbency of the material. The resulting de-watered filtrate left from whichever de-watering process employed, comprises substantially all of the nutrient content of the liquid organic feed stock. This pre-treated material is then fed into the first grinder.

The organic feedstock 22 is placed into the first grinder 20, where it is blended with the lime admixture 23, which is a calcified organic material. The lime admixture has a basic pH of approximately between 8 and 11, and acts as a basifying agent to stabilize the organic feedstock. This stabilization is achieved by substantially halting the growth of the microbe populations within the organic feedstock. The lime admixture begins a chemical reaction with the organic feedstock to initiate a hydrolysis of the carbon-containing organic materials within the feedstock. Through hydrolysis, the reaction of the basic lime with the acidic organic feedstock provides bonding sites. This acid/base reaction also generates heat and raises the pH, both of which aid in a disinfection of the organic feedstock.

The lime admixture 23 and organic feedstock 22 are discharged from the first grinder 20 as a basified pre-product 35. This pre-product is preferably stored in a bulk storage, which can be any appropriate storage device, such as a silo, trench or pile. Additionally, this bulk storage preferably acts as a surge flow buffer to provide for a constant pre-product flow to subsequent process steps. The pre-product is preferably covered to keep it from being leached by rainfall and to protect it from freezing. Alternatively, the pre-product can be immediately transferred to the remaining steps of the process of the present invention.

C. Addition of Nutrients

Next, the pre-product 35 is introduced into a second mixer 40 where other materials are added to form a raw product 59. Like the first mixer 30, the second mixer is also preferably an agglomerator. Also alternatively, the first mixer and the second mixer can physically be one and the same device, which alternates its feeds to function as either the first mixture or the second mixer.

An important material introduced into the second mixer 40 is a nutrient admixture 42. The nutrient admixture can include many nutrient adjuncts 44, as shown in FIG. 1. These nutrient adjuncts preferably include a source of trace minerals 45, a nitrogen source 46, a sulfur source 47, a phosphorous source 48, a potash source 49, and a magnesium source 50.

The formulation of the nutrient adjuncts 44 is also preferably established by first acquiring a soil chemical and biological analysis of the soils, at least generally, for the type of soil that will receive or be treated with the fertilizer product of the present invention. Additionally, the nutritional requirements of the crops planted or proposed for planting, which will receive the uniprill product 10, can be considered. A list of needed nutrients can then be compiled. These nutrient requirements, as compared with a chemical analysis of the organic material, can dictate the chemical constituents of the nutrient adjuncts.

For the nutrient adjuncts 44, the nitrogen 46 source is preferably urea, while the sulfur 47 source can be any elemental sulfur that is reasonably pure and free from unwanted impurities. The phosphorous 48 source is preferably a raw phosphorous ore, and the potash 49 is any appropriate potassium containing material, with the potassium typically in the form of potassium oxide ($K_2O$).

The nutrient adjuncts 44, as combined in the nutrient admixture 42 are added to the pre-product 35 in the second mixer 40, to satisfy the requirements of a balanced and complete plant food and soil adjuvant. These adjunct nutrients can consist of but are not limited to: ammonium phosphate, nitrate, potassium sulfate, sol-po-mag or "K-Mag," potassium chloride, rock phosphate, Chilean nitrate, trace minerals or soil adjuvants, as required. The selection of specific reactants and additives that contain the desired nutrient can additionally depend on whether a certified organic fertilizer or standard organic-based fertilizer is to be manufactured by the process of the present invention.

Before introduction into the second mixer 40, The nutrient adjuncts 44 are preferably mixed with water 51 and a binder 52 in forming the nutrient admixture 42. The nutrient admixture is preferably circulated through a high speed, in-line mixer. A high shear, in-line mixer, as manufactured by Siverson Machines, Inc., of East Longmeadow, Mass., U.S.A., is preferred. The binder is preferably a wood processing waste product, such as lignin, lignite, lignin sulfonate, or alternatively a starch or sugary material, such as molasses, corn starch or potato starch.

The nutrient admixture 42 is preferably held in a tank or storage container until it is needed in the second mixer 40. Most preferably, the reagents in this container are circulated and blended to maintain the nutrient adjuncts in solution. As an alternative, the adjuncts could be added individually, without first mixing, adding water 51 or adding the binder 52. However, to maintain a repeatable and consistent composition in the product, the combined addition of the adjuncts in the nutrient admixture is most preferred.

B. Lowering the pH

The nutrient admixture 42 is preferably combined with a strong acid 54 in the second mixer 40. This strong acid is most preferably a combination of sulfuric acid and phosphoric acid. Additional or alternative acids can also be employed. In one such alternative, if the strong acid is sulfuric acid, the strong acid is metered into the second mixture to provide the needed final sulfur content for the uniprill product 10. Similarly, as an alternative, a phosphoric acid can be utilized to supplement the phosphorus content of the final product. Other acids that can be employed include nitric acid, carbonic acid, and various organic acids such as citric and fulvic acid, depending on the pH and nutrient requirements of the uniprill product 10.

The primary purpose of the strong acid 54 is to process the pre-product 36 by a standard acid/base reaction. An immediate and strong exothermic reaction occurs with temperatures reaching as high as approximately two hundred degrees F. The pre-product is substantially sterilized by the reaction and neutralized to liberate the carbonate ions as carbon dioxide gas. The second mixer can also receive screen unders 57, which are a fines material produced in a later process step.

The second mixer 40 is preferably a weighing vessel and mixer combination. When the liquid nutrient admixture 42, having been premixed in a liquid mixing tank, is pumped into the second mixer, the weighing feature of the mixing vessel provides for an exact measurement of the additions to the second mixer. Such combination of mixing vessels with integral weighing capabilities are available from several manufacturers and are well known in the industrial chemical processing field.

Most preferably, the addition of the nutrient admixture 42 to the second mixer 40 is immediately followed by the addition of the strong acids 54, and then by the addition of the screen unders 57. These nutrient and acid components, in predetermined quantities, are mixed in the second mixer to create a raw fertilizer product 59 that includes the desired quantities of all sixteen known mineral plant nutrients.

C. Addition of Organic Nutrients

Additional nutrients can now be added to the second mixer 40, especially organic nutrients that do not promote or require chemical reactions for activation. Specifically, a humic acid 62, or material rich in humic acids, is preferably supplemented into the second mixer as such an additional nutrient, as shown in FIG. 1. Humic acids are delicate, complex organic molecules. Acid/base reactions within prior process steps, such as within the first mixer or especially within the second mixer, can alter or degrade the humic acids, breaking them up and reducing their effectiveness as a storage molecule of essential plant nutrients. Therefore, the humic acid materials are preferably added to the second mixer only after any and all energetic reactions, to keep the humic acids intact and preserve their full value.

D. Second Grind

After addition of the humic acids 62 to balance out the formulation, the second mixer produces the raw product 59. As shown in FIGS. 2 and 3, the raw product is fed into a drier 64 to further agglomerate the raw product into a uniprill and reduce the moisture content of the material to a desired level, which is approximately 15% to 20% moisture, by weight. The drier is preferably a conventional rotary or drum drier, having a natural gas fired burner for driving off moisture from the raw product material. If, after a first pass through the drier, the raw product still contains too much moisture, a recycle stream 63 of the dried raw product can be back fed into the drier, as shown in FIGS. 2 and 3. This recycle stream can be any fraction of the dried raw product stream as required to achieve the desired final moisture content.

As shown in FIG. 3 the raw product 59 is optionally passed through a second grinder 65 to further complete the uniprilling process. The decision to pass the dried raw product through the second grinder is based upon the particle size and moisture content of the raw product versus the desired particle size and moisture content of the final uniprill product 10. The moisture content of the raw fertilizer product will usually be in the 15% to 20% range, by weight, after the drier 64, prior to the second grind. However, for extra moist component materials, the second grinder may be required to further dry, mix and reduce the particle size of the raw fertilizer product. Additionally, the raw fertilizer product will be hot from the exothermic reaction in the second mixer 40 and is now ideally conditioned for further blending and drying in the second grinder.

The second grinder 65, like the first grinder 20 is preferably a vertical cyclone. Again, most preferably, a "Mobile PowerMaster 250™" brand of vertical cyclonic processor, as manufactured by American Resource Technologies of Sterling Colo., U.S.A., is employed. As an alternative, primarily to economize on equipment costs, the first grinder can be utilized as the second grinder.

After the drying agglomeration of the first mixer 30, the first grinder 20, the second mixer 40 and the drier 64, the raw product 59 is sized fractionated in a screen 67, as shown in FIGS. 2 and 3. The screen can be a conventional two deck screen, as shown in FIG. 2. The top screen is a coarsely meshed screen that prevents screen overs 37 from passing through. These coarse screen overs are preferably recycled back into the process, most preferably into the first grinder 20. The material that passes through the coarsely meshed screen then contacts a finely meshed screen. Screen unders 57 to pass through the finely meshed screen as fines. These screen unders are also recycled back into the process, preferably into the second mixer 40. The size fraction that remains between the coarsely meshed screen an the finely meshed screen is the uniprill product 10 and preferably is sized between 30 and 400 standard mesh size, which can be packaged and distributed for sale, or sold in bulk, as is. This packaging can include bagging 73 to produce a bagged product 75, as shown in FIG. 2. As an alterative additional process step, the uniprill product can fed into a micro-fluidizer 68 to produce a liquid product 70 that is ideal for irrigation applications, such as with sprinklers or drip irrigation systems.

Preferably, as shown in FIG. 3, the sizing is accomplished in a screen 67 that is a three deck sizing screen. The screen's decks classify the raw product into a coarse fraction and a fine fraction. As with the two deck screen of FIG. 2, the screens overs 37 are prevented from passing through the top, coarsely meshed screen, while the screen unders pass completely through the screen, including the bottom, finely meshed screen. Also, as with the two deck screen, the screen overs are preferably recycled back into the process, most preferably into the first grinder 20, and the screen unders are also recycled back into the process, preferably into the second mixer 40.

As also shown in FIG. 3, the screen 67, produces a first uniprill product and a second uniprill product. The first uniprill is a coarser product that does not pass through an intermediate screen that has a mesh size between the coarsely meshed screen and the finely meshed screen. The second uniprill product is the size fraction that passes through the intermediate screen but does not pass through the finely meshed screen. Preferably, the finely meshed screen has a mesh size of approximately 18 standard mesh.

The resulting uniprill product 10, especially the second uniprill product 10B, as preferably produced by the process as shown in FIG. 3, can be processed with a micro-fluidizer 68. Preferably, the micro-fluidizer is a high shear, micronizing line mixer, as preferably manufactured by Siverson Machines, Inc., of East Longmeadow, Mass., U.S.A. The rotors and stators in the workheads of these conventional devices will homogenize, dissolve, disperse, disintegrate and emulsify down to the ten micron range, which will satisfy drip irrigation and special suspension application requirements in a novel use of this micronizing device in the process of present invention.

The larger uniprill product 10, specifically the first uniprill product 10A as produced by the process of the present invention, as shown in FIG. 3, includes particles ranging from approximately 8 to 12 standard mesh screen size, to meet farm and garden requirements.

In compliance with the statutes, the invention has been described in language more or less specific as to structural features and process steps. While this invention is susceptible to embodiment in different forms, the specification illustrates preferred embodiments of the invention with the understanding that the present disclosure is to be considered an exemplification of the principles of the invention, and the disclosure is not intended to limit the invention to the particular embodiments described. Those with ordinary skill in the art will appreciate that other embodiments and variations of the invention are possible, which employ the same inventive concepts as described above. Therefore, the invention is not to be limited except by the following claims, as appropriately interpreted in accordance with the doctrine of equivalents.

The following is claimed:

1. A process for mechanically and chemically treating an organic feedstock comprising the steps of:
   a) mixing an organic material with a calcium source;
   b) grinding the calcified organic matter to form a pre-product;
   c) mixing the pre-product with a strong acid mixture and adding additional plant nutrients to form a raw product;
   d) grinding, and blending the raw product; and
   e) screening the ground and blended raw product to form a uniprill product.

2. The process of claim 1, wherein the step of mixing the organic material with a calcium source first includes:
   obtaining the organic material from a micro-filtered organic liquid waste, the raw product produced from the micro-filtered organic waste having a water content of between 15 percent and 20 percent, by weight.

3. The process of claim 1 additionally including the step of:
   f) liquefying the uniprill product with a micro-fluidizer to achieve an average particle size in a 1 to 60 micron range.

4. A process of manufacturing an organic fertilizer comprising the steps of:
   a) mixing an organic material with a calcium ion source in the amounts required to obtain a pH of approximately 8 to a pH of approximately 11, to produce a calcified organic matter;
   b) grinding the calcified organic matter with a grinder to produce a ground and calcified organic matter having a powder consistency between 30 standard mesh size and 400 standard mesh size; and
   c) mixing the calcified organic matter with a strong acid and a mixture of nutrients, to form a raw product.

5. The process of claim 4, additionally including the step of:
   d) mixing the screened and calcified organic matter with a humic acid.

6. The process of claim 4 additionally including the steps of:
   c) re-grinding the raw product; and
   d) screening the re-ground raw product.

7. The process of claim 4 additionally including the steps of:
   d) liquefying the ground and screened raw product with a high speed mixer pump; and
   e) micro-fluidizing the raw product to further reduce particle size to approximately between 1 microns and 60 microns.

8. The process of claim 4, wherein the step of mixing the organic material first includes a step of obtaining the organic material from a micro-filtered organic liquid waste.

9. The process of claim 4, wherein the step of mixing the organic with a calcium ion source material first includes a step of obtaining the organic material from galvanic agglomeration.

10. The process of claim 4, wherein the step of mixing the organic material with a calcium ion source additionally includes mixing the organic material with a carbonate anion source.

11. The process of claim 4, wherein the step of mixing the organic material with a calcium ion source additionally includes mixing the organic material with a hydroxide anion source.

12. The process of claim 4 additionally including the step of:
   d) mixing the calcified organic matter with a solution of binders and plant nutrients, to form a raw product.

13. The process of claim 12, wherein the step of mixing the screened and calcified organic matter with the solution of binders and plant nutrients and water to form a raw product, additionally includes heating the calcified organic matter with the solution of binders and plant nutrients.

14. The process of claim 4, additionally including the step of:
   d) adding additional plant nutrients as indicated by a soil chemical and biological analysis, as compared with a chemical analysis of the organic material.

* * * * *